United States Patent [19]

Dittmar

[11] Patent Number: 4,979,387

[45] Date of Patent: Dec. 25, 1990

[54] PENDULUM POSITION DETECTOR

[76] Inventor: Norman R. Dittmar, 525 5th Ave., N.W., Rochester, Minn. 55901

[21] Appl. No.: 386,719

[22] Filed: Jul. 31, 1989

[51] Int. Cl.[5] ...................... G01B 11/00; G01D 18/00

[52] U.S. Cl. ........................................... 73/6; 250/224; 250/341; 356/375

[58] Field of Search ...................... 73/6; 368/165, 166, 368/179–183; 356/375; 250/222.1, 224, 338.1, 340, 341

[56] References Cited

U.S. PATENT DOCUMENTS

| | | | |
|---|---|---|---|
| 2,587,452 | 2/1952 | Forris | 73/6 X |
| 3,926,048 | 12/1975 | Uebelhart et al. | 73/6 |
| 3,949,592 | 4/1976 | Berney | 73/6 |
| 4,335,596 | 6/1982 | Greiner | 73/6 |

FOREIGN PATENT DOCUMENTS

| | | | |
|---|---|---|---|
| 3335347 | 4/1985 | Fed. Rep. of Germany | 250/341 |
| 174705 | 10/1984 | Japan | 356/375 |
| 14104 | 1/1985 | Japan | 356/375 |
| 212502 | 9/1987 | Japan | 356/375 |
| 1293489 | 2/1985 | U.S.S.R. | 356/375 |
| 2207530 | 2/1989 | United Kingdom | 368/165 |

*Primary Examiner*—Tom Noland

[57] ABSTRACT

An opto-electronic device for accurately defining the position of a pendulum in libration, is disclosed. The chief use intended by the inventor is to enable accurate passive determination of the beat rate of a newly installed or repaired pendulum type clock. The device is easy to use and does not perturb the pendulum. A novel circuit configuration automatically recognizes an edge of a pendulum for production of a defining electronic pulse.

3 Claims, 2 Drawing Sheets

-PRIOR ART-

PENDULUM POSITION DETECTOR

REFERENCES CITED

U.S. Pat. No. 4,335,596, Oct. 30, 1978, Y. Greiner, US Cl 73/6, Int Cl G04B 17/00; G04D 5/00, U.S. Pat. No. 3,926,048 Dec. 12, 1972, H. Uebelhart, et al, US Cl 73/6, Int Cl G04d 7/12.

BACKGROUND OF THE INVENTION

Timers for measuring the rate defect of a timepiece have been used for a number of years by watchmakers, other clock repairmen, and clock retailers. (Pertaining to a timepiece herein, by "rate defect" is meant an expression of how fast or slowly it is running with respect to standard time). The first timers to be patented in this country detected the ticking sound (beat) produced by an escapement, converted the sound to an electrical pulse, measured the time between a certain number of these pulses, and then delivered to the operator an indication of rate defect. Examples of such timers are found in U.S. Pat. No. 4,335,596 and 3,926,048, among others.

Given some means of producing an electronic pulse for each period of a clock's movement, the subsequent circuitry for timing the pulses and delivering a display of rate defect may now be called conventional post beat detection circuitry, and for the sequel of this disclosure will be referred to as conventional timing circuitry.

To date in all devices for timing clocks, there is little if any allusion to pendulum clock timers as a separate class. Until a decade ago the dominant type of movement for both watches and pendulum clocks was the mechanical movement. Perhaps this is why pendulum timers have been available only as accessories or extensions to watch timers which work off of an escapement beat.

The usefulness of conventional timers in the case of pendulum clocks has been hampered by the inconvenience of timing a clock which cannot be easily moved and by the less precise performance of beat detectors, when applied to pendulums, than when applied to watches.

SUMMARY OF THE INVENTION

The purpose of the present invention is to generate a well-defined pulse for each period of a pendulum in libration. The pulse train so produced may then be used with conventional timing circuitry to produce an improved pendulum timer.

The present invention involves two discoveries:

1. The propitious applicability of recently developed reflective semiconductor optical position sensors, employing near infrared emitter-detector pairs, to the task of (See FIG. 1) producing well defined electronic pulses representing the position of a pendulum, in that:
   a. The wavelength of the radiation typically used works well with the surfaces of non-ferrous metals commonly used in pendulums, whether polished or dull,
   b. Said sensors operate from one side of a surface.
   c. Fine spatial resolution is readily achieved without any need for precise fixturing of said sensor with respect to any pendulum.

2. A circuit configuration for producing an electronic pulse when, and only when, a pendulum disc crosses the zone of active sensing (ZAS) of such a sensor. (See FIGS. 1 and 2).

When employed in an electronic pendulum timer, the advantages of the present invention over previous pendulum timers working off of a beat are:

1. superior precision and accuracy: Readings accurate to within two seconds per day (s/da) are readily achieved on a high quality pendulum clock, compared with typically nine s/da with a timer employing a beat detector.
2. freedom from the problem of noise interference
3. lower cost: The cost of components going into the present invention in its preferred embodiment is $5.00 (allowing $3.50 for the OPS), whereas the cost of components going into a beat detector might be $15.00 (allowing $11 for a microphonic sensor and $4 for the remaining amplification and pulse discrimination components).

If conventional timing circuitry be applied to the electronic pulse generated by an OPS with a pendulum disc moving through its ZAS, it is found that the combination does not function as a pendulum timer. Two factors account for this:

a. As a pendulum disc passes through the ZAS of an OPS The OPS may produce several pulses, throughout one period of said pendulum, depending upon the topography of the disc.
b. The optimum instant in a pendulum's period of motion at which to generate a pulse for timing is not the same as when a beat is generated by an escapement attached thereto.

The first of these is a problem which is overcome by the present invention. It in effect screens out unwanted pulses which may be produced in multiplicity as a disc passes through a ZAS. Then, it will not generate any more pulses until there has been a lapse (in reflected infrared radiation) long enough to ensure that the next pulse will be caused by the edge of the pendulum disc. It also automatically rejects pulses having so gradual a rate of rise that they would not be suitable for defining said pendulum's position.

With regard to the second of the aforementioned factors, the superior accuracy achievable with the present invention may be elucidated: When the beat of an escapement is used for timing, there is no choice as to the point within the period of libration when the beat is emitted. When an OPS having a certain ZAS is used, however, the position of the OPS may be adjusted such that the pendulum is at bottom dead center (BDC) when the edge of it's disc is crossing said ZAS. When this condition is met, there is an improvement in ensuing rate defect measurement by a ratio of approximately five to one over that of timers which employ beat detectors.

The present invention comprises: (See FIG. 2)

(1) an optical position sensor (OPS) 2 having a window 6, an associated zone of active sensing (ZAS) 9, and an output terminal 3, such that, whenever a reflective surface enters said ZAS, said surface being parallel to said window, an electronic pulse emerges from said output terminal.

(2) an AND circuit 14 having first and second gates and an output terminal 17, the first gate as main gate 16 and the second as enabling gate 15, wherein main gate 16 is connected to said output terminal 3 of said OPS, (3) a timing capacitor 13 whose degree of charging determines the logic level on enabling gate 15, (4) a lapse timing resistor 12 connected across said timing capacitor 13, and (5) a rise-rate resistor 22 through which timing capacitor 13 may be charged, disenabling AND 14.

(6) an electronic switch 18 having a switching terminal 19 and two switched terminals 20 and 21 which are connected or disconnected depending upon the emf on said switching terminal. The switch has an associated threshold for swiching, such that, if the emf on the switching terminal 19 exceeds said threshold, the switch 18 is ON, and its two switched terminals 20 and 21 are connected together.

The output terminal 17 is also the output terminal of the invention.

The timing capacitor is connected to zero impedance, i.e., either to ground 1 or to the dc power net 11 for the configuration. The latter connection is used herein.

When said OPS is brought near a swinging pendulum disc, (See FIGS. 4 and 5) it may happen that the first pulse produced at terminal 3 is caused by some portion of the surface of the disc which is not near the edge of the disc. However, the rate of rise of said pulse will not, in general, be large enough to stop switch 18 from taking away the enable from gate 15.

Suppose the pendulum is moving to the right. Once the disc clears said ZAS there will be no more pulses at terminal 3 for an elapse which is approximately equal to ½ of a pendulum period. The lapse timing resistor 12 is chosen such that capacitor 13 will have time to discharge during this elapse, restoring logical one (H) to gate 15.

As the edge of the disc (now moving to the left) moves into the ZAS, the AND 14 will at that instant have H on its main gate 16. Output 17 will therefore go to H. The switch 18 has also been turned ON, however, causing timing capacitor 13 to charge through rise-rate resistor 22, so that the level at 15 returns to L (logical 0).

In the case of a smooth disc the output of the OPS at 3 will stay at H as long as the disc is in front of the OPS, but switch 18 will be ON the whole time, keeping terminal 17 at L.

In the case of a wrinkled disc surface passing before the OPS, so that said surface is not always parallel to OPS window 6, the output of the OPS may dip to L but return to H so soon that the timing capacitor 13 is still charged enough to keep the enabling gate 15 at L. No new pulse is generated at invention output terminal 17.

The configuration, with a certain set of values for components 12, 13, and 22, covers all pendulums wherein the length of the longest to be considered is four times that of the shortest to be considered.

The minumum period anticipated, is used to determine the value of lapse time resistor 12 such that nearly ½ of said period must elapse before 13 discharges sufficiently to restore the enable at 15.

The threshold for switching for the electronic switch 18 must be less than or equal to that of the main gate 16, to ensure that the enable is removed from 15 throughout a slowly rising pulse from the OPS at 3.

The capacitor 13 may be a polarized capacitor.

DETAILED DESCRIPTION OF THE PREFERRED EMBODIMENTS

Figure 1:
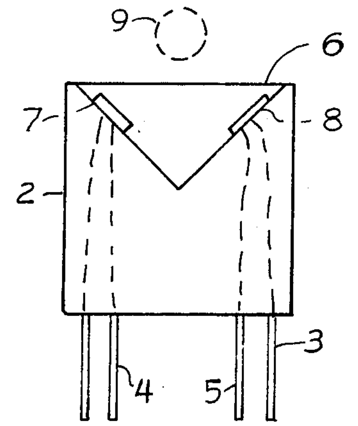
FIG. 1 is an illustration of a typical optical position sensor. The zone of active sensing (ZAS) 9 is shown schematically connected to input and output lines 4 and 5. Diode 7 emits near infrared radiation; Phototransistor 8 (having a collector and an emitter) detects said radiation causing pulse at 3. Terminal 5 is connected to said collector.
Figure 2:
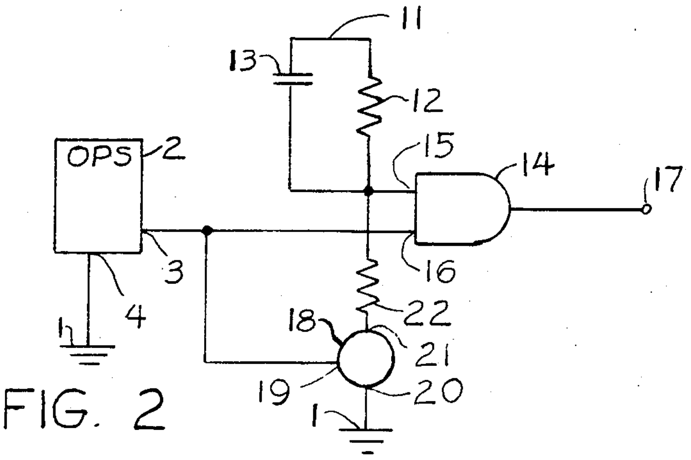
FIG. 2 represents the invention and all its elements.
Figure 3:
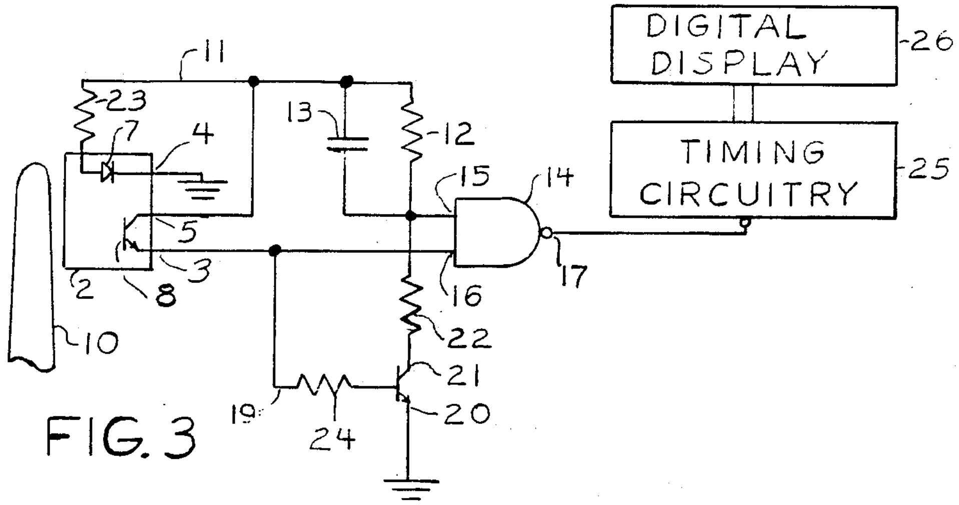
FIG. 3 illustrates the invention implemented in a pendulum timer.
Figure 4:
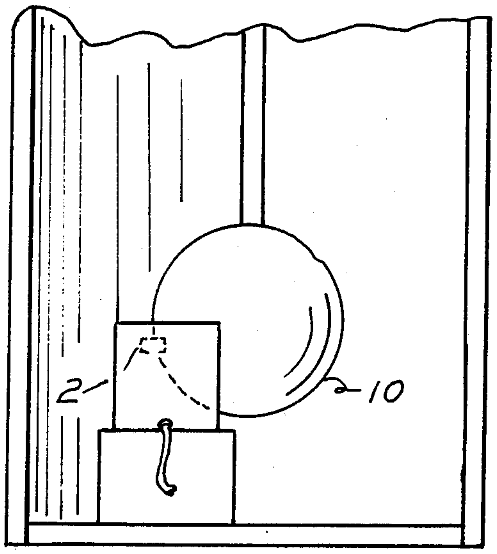
FIG. 4 is the front view of a pendulum clock showing the ideal placement of an OPS with respect to pendulum disc.
Figure 5:
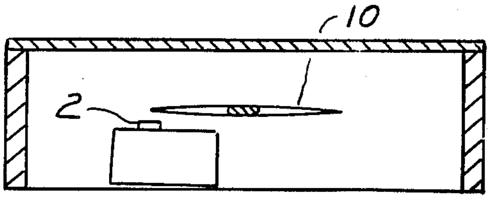
FIG. 5 is the top view of FIG. 4.

Please refer to FIG. 3. The invention has been implemented in one form using the following components: The OPS is an OMRON (Japanese) commercially available OPS; electronic switch 18 is a regular NPN transistor; AND 14 is a regular integrated circuit (74C00).

The operation of this configuration is just as in the SUMMARY above.

The resistor 23 limits the current passing through the infrared emitting diode 7, via an anode terminal 6.

The lapse time resistor 12 value is determined by $$R12 = \frac{7/16 \times \text{(said minimum period)}}{C13} \times \ln 2$$

where C13 is the capacitance of 13.

The rise-rate resistor 22 value is determined by:

$$R22 = \frac{1/100 \times \text{(said minimum period)}}{C13} \times \ln 2$$

where ln2 may be taken to be 0.69.

Resistor 24 allows adjustment of the threshold for switching of 18.

Blocks 25 and 26 represent conventional timing circuitry, 26 representing a panel display.

I claim:

1. A Pendulum Position Detector configuration comprising:

a. an optical position sensor having a window, a zone of active sensing (ZAS), a ground terminal, and an output terminal, wherein said sensor produces an electronic pulse at said output terminal whenever a pendulum disc passes through said ZAS, and the ground terminal is connected to a ground node for the configuration, b. an AND circuit having first and second gates each gate having an associated threshold for switching, and an output terminal, wherein the second gate is connected to the output terminal of said sensor, and output terminal of said AND is the output terminal for the configuration, c. a timing capacitor connected from said AND first input terminal to a dc power net for the configuration, d. a lapse time resistor connected from said first gate to said dc power net, e. a rise-rate timing resistor having first and second leads, with first lead connected to said first gate, and f. an electronic switch having a switching terminal and two terminals to be connected and disconnected by a control emf of said switching terminal, wherein said switching terminal is connected to output terminal of said sensor, and said two terminals are connected between said second lead and configuration ground.

2. Configuration as in claim 1, wherein the threshold for switching of said electronic switch is less than or equal to that of said gates.

3. A method to aid in calibrating a pendulum clock having a pendulum disc, comprising:

(a) using a pendulum position detector configuration like that of claims 1 or 2 to monitor the position of the pendulum disc, the pendulum postion sensor being a near-infrared optical position sensor (OPS) and placed close to, but not in the path of the pendulum disc in libration, so that an electronic pulse is produced by said OPS as said pendulum disc swings by, the OPS being positioned such that said pendulum disc is at bottom dead center of its libration arc when the pulse is produced thereby, a train of pulses thereby produced, one for each libration of the pendulum disc; and (b) timing the periodic motion of the pendulum disc with the timing circuitry of a pulse timing configuration and electronically displaying timing rate defect.

* * * * *